US011739286B2

(12) United States Patent
Green et al.

(10) Patent No.: US 11,739,286 B2
(45) Date of Patent: Aug. 29, 2023

(54) SOIL RELEASE POLYMERS AND LAUNDRY DETERGENT COMPOSITIONS CONTAINING THEM

(71) Applicant: Conopeo, Inc., Englewood Cliffs, NJ (US)

(72) Inventors: Andrew David Green, Dobshill (GB); Alyn James Parry, Neston (GB); Susanne Henning Rogers, Liverpool (GB)

(73) Assignee: Conopco, Inc., Englewood Cliffs, NJ (US)

( * ) Notice: Subject to any disclaimer, the term of this patent is extended or adjusted under 35 U.S.C. 154(b) by 511 days.

(21) Appl. No.: 16/755,980

(22) PCT Filed: Nov. 15, 2018

(86) PCT No.: PCT/EP2018/081453

§ 371 (c)(1),
(2) Date: Apr. 14, 2020

(87) PCT Pub. No.: WO2019/096942

PCT Pub. Date: May 23, 2018

(65) Prior Publication Data

US 2020/0255766 A1 Aug. 13, 2020

(30) Foreign Application Priority Data

Nov. 17, 2017 (EP) .................................... 17202408

(51) Int. Cl.

| | |
|---|---|
| ***C11D 1/00*** | (2006.01) |
| ***C11D 3/37*** | (2006.01) |
| ***C08G 63/672*** | (2006.01) |
| ***C11D 3/00*** | (2006.01) |
| ***C11D 11/00*** | (2006.01) |

(52) U.S. Cl.
CPC .......... *C11D 3/0036* (2013.01); *C11D 3/3715* (2013.01); *C11D 3/3723* (2013.01); *C11D 11/0017* (2013.01)

(58) Field of Classification Search
CPC ....... C11D 1/00; C11D 3/0036; C11D 3/3707; C11D 3/3711; C11D 3/3715; C11D 3/3723; C11D 3/3757; C08G 63/672
See application file for complete search history.

(56) References Cited

U.S. PATENT DOCUMENTS

2016/0311208 A1* 10/2016 Nederberg .............. B32B 27/08
2020/0407494 A1* 12/2020 Mutch .................. C08G 63/672

FOREIGN PATENT DOCUMENTS

| | | | | |
|---|---|---|---|---|
| CN | 103347927 A | 10/2013 | | |
| EP | 3360911 * | 8/2018 | ............. | C08G 63/20 |
| JP | 2015105373 | 8/2015 | | |
| WO | WO9419448 | 9/1994 | | |
| WO | 2012104158 A1 | 8/2012 | | |
| WO | 2016005271 A1 | 1/2016 | | |
| WO | 2017174258 A1 | 10/2017 | | |

OTHER PUBLICATIONS

Search Report and Written Opinion in EP17202408; dated Feb. 2, 2018.
Search Report and Written Opinion in PCTEP2018081453.

* cited by examiner

*Primary Examiner* — Brian P Mruk
(74) *Attorney, Agent, or Firm* — Carter, DeLuca & Farrell LLP; George Likourezos; Bret Shapiro

(57) ABSTRACT

The invention provides a polymer providing soil release properties (also termed a "soil release polymer" or SRP) when incorporated in a laundry detergent composition, the polymer comprising a capped polyoxyalkylene end block connected to a polyester segment; the polyester segment comprising alternating —$B^1$-A-$B^2$— and —R— units; in which $B^1$ and $B^2$ are each independently selected from —OC(O)— and —C(O)O— groups; A is a 2,5-furanylene ring and R is a divalent alkylene radical. The polymer provides good compatibility, stability and cleaning performance when incorporated into a laundry detergent composition, preferably a liquid laundry detergent composition, comprising one or more detersive surfactants.

5 Claims, No Drawings

SOIL RELEASE POLYMERS AND LAUNDRY DETERGENT COMPOSITIONS CONTAINING THEM

RELATED APPLICATIONS

This application is a national phase filing under 35 USC 371 of International Application No. PCT/EP2018/081453, filed on Nov. 15, 2018, which claims priority from European Patent Application No. 17202408.5, filed Nov. 17, 2017, the contents of which are incorporated herein in their entirety for all purposes.

FIELD OF THE INVENTION

The present invention relates to novel soil release polymers derivable from non-petrochemical feedstocks and their use in laundry detergent compositions.

BACKGROUND AND PRIOR ART

Soil release polymers (SRPs) adsorb to fibre surfaces during the wash process, modifying their surface properties and leading to reduced stain adhesion in subsequent wear and easier stain removal.

Efforts have been made in the prior art to develop polymers which have soil release promoting properties and which are amenable to synthesis from bio-derived materials. JP2015105373 describes soil release agents utilising a combination of ethylene furandicarboxylate and polyoxyethylene furandicarboxylate units to create material that exhibits a soil release effect in the field of laundry cleaning.

However, the material described in JP2015105373 may not provide sufficient formulation compatibility or soil release performance when incorporated into laundry detergents such as liquids.

The present invention addresses this problem.

SUMMARY OF THE INVENTION

The present invention provides a polymer providing soil release properties (also termed a "soil release polymer" or SRP) when incorporated in a laundry detergent composition, the polymer comprising a capped polyoxyalkylene end block connected to a polyester segment; the polyester segment comprising alternating $—B^1\text{-}A\text{-}B^2—$ and —R— units; in which $B^1$ and $B^2$ are each independently selected from —OC(O)— and —C(O)O— groups; A is a 2,5-furanylene ring and R is a divalent alkylene radical.

The invention also provides a laundry detergent composition, preferably a liquid laundry detergent composition, comprising one or more detersive surfactants and a soil release effective amount of a polymer as defined above.

DETAILED DESCRIPTION AND PREFERRED EMBODIMENTS

The soil release polymer of the invention comprises, inter alia, a capped polyoxyalkylene end block. A preferred structure for the end block corresponds to the following general formula (I):

$$X\text{-}[(EO)_n(PO)_m]— \qquad (I)$$

in which $(EO)_n$ represents an ethylene oxide block; $(PO)_m$ represents a propylene oxide block; m is a number from 0 to 30; n is a number from 10 to 80 and X is a capping group which is preferably selected from 01-4 alkyl groups, more preferably methyl, ethyl, or n-butyl and most preferably methyl or n-butyl.

Because they are averages, m and n are not necessarily whole numbers for the polymer in bulk.

Preferred soil release polymers of the invention are linear. If required, branching can be created by use of tri substituted furanylene or branched alkylene groups.

The polymer may have two capped polyoxyalkylene end blocks, one on each end, or a single capped polyoxyalkylene end block on one or the other end. The formulae given throughout the claims and description should be interpreted to include either variant.

A preferred structure for the divalent alkylene radical R corresponds to the following general formula (II):

$$—CH(R^1)CH(R^2)— \qquad (II)$$

in which $R^1$ and $R^2$ are each independently selected from H, $C_{1\text{-}4}$ alkyl and $C_{1\text{-}4}$ alkoxy. Preferably $R^1$ and $R^2$ are each independently selected from H and $CH_3$. More preferably, $R^1$ and $R^2$ are each independently selected from H and $CH_3$, and at least one of $R^1$ and $R^2$ is $CH_3$. Most preferably the divalent alkylene radical R is a $—CH_2CH(CH_3)—$ group.

The capped polyoxyalkylene end block may suitably be connected to the polyester segment via a linking group. Preferably such a linking group corresponds to the general formula $—B^1\text{-}A\text{-}B^2—$ in which A, $B^1$ and $B^2$ are as described above. One or both of ester groups $B^1$ and $B^2$ in the linking group could be replaced with urethane or amide groups if desired.

Preferred soil release polymers of the invention for use in laundry detergent compositions, such as liquid laundry detergent compositions, have a weight average molecular weight ($M_w$) ranging from about 1,000 to about 20,000, preferably from about 1,500 to about 10,000.

A particularly preferred soil release polymer of the invention corresponds to the following general formula (III):

$$X\text{-}[(EO)_n(PO)_m]—[OC(O)\text{-}A\text{-}C(O)O—CH_2CH(CH_3)]_z— OC(O)\text{-}A\text{-}C(O)O—[(PO)_m(EO)_n]—X \qquad (III)$$

in which A is a 2,5-furanylene ring; X is $C_{1\text{-}4}$ alkyl; m is from 0 to 30; n is from 10 to 80; and z is at least 2.

Because it is an average, z is not necessarily a whole number for the polymer in bulk. The value of z may, for example, range from 3 to 10.

The capped polyoxyalkylene end block of the soil release polymers of the present invention may suitably be prepared by anionic polymerisation of alkylene oxide (preferably propylene oxide) using a preformed mono-functional polyalkylene glycol (preferably polyethylene glycol) as the initiator.

The polyester segment of the soil release polymers of the present invention may suitably be prepared by condensation of methyl esters of furan-2,5-dicarboxylic acid with aliphatic diol (preferably 1,2 propane diol). The reaction is suitably carried out in the presence of a condensation catalyst, at an elevated temperature, for example, 150 to 200° C. The lower alcohol, normally methanol, generated during the reaction is distilled off. A preferred catalyst comprises sodium acetate (NaOAc) and tetraisopropyl orthotitanate (IPT). Typically, a preformed capped polyoxyalkylene end block (prepared, for example, by the anionic polymerisation process described above) is then added to the reaction vessel and the mixture polymerised to the desired molecular weight, by raising the temperature further, typically to 180 to 250° C. The degree of polymerisation may suitably be monitored by methods such as gel permeation chromatography, NMR, and end-group titration. The soil release polymers of the invention are suitable for incorporation into laundry detergent compositions of all physical forms, for example, liquids, powders, gels, tablets and bars.

A preferred product form is a liquid laundry detergent.

The soil release polymers of the invention may suitably be incorporated into laundry detergent compositions, such as liquid laundry detergent compositions, in amounts of from 0.1 to 10%, preferably from 0.3 to 7%, most preferably from 0.5 to 5% (by weight based on the total weight of the composition).

The term "laundry detergent" in the context of this invention denotes formulated compositions intended for and capable of wetting and cleaning domestic laundry such as clothing, linens and other household textiles. The term "linen" is often used to describe certain types of laundry items including bed sheets, pillow cases, towels, tablecloths, table napkins and uniforms. Textiles can include woven fabrics, non-woven fabrics, and knitted fabrics; and can include natural or synthetic fibres such as silk fibres, linen fibres, cotton fibres, polyester fibres, polyamide fibres such as nylon, acrylic fibres, acetate fibres, and blends thereof including cotton and polyester blends.

Liquid Laundry Detergents

Examples of liquid laundry detergents include heavy-duty liquid laundry detergents for use in the wash cycle of automatic washing machines, as well as liquid fine wash and liquid colour care detergents such as those suitable for washing delicate garments (e.g. those made of silk or wool) either by hand or in the wash cycle of automatic washing machines.

The term "liquid" in the context of this invention denotes that a continuous phase or predominant part of the composition is liquid and that the composition is flowable at 15° C. and above. Accordingly, the term "liquid" may encompass emulsions, suspensions, and compositions having flowable yet stiffer consistency, known as gels or pastes. The viscosity of the composition may suitably range from about 200 to about 10,000 mPa·s at 25° C. at a shear rate of 21 $sec^{-1}$. This shear rate is the shear rate that is usually exerted on the liquid when poured from a bottle. Pourable liquid detergent compositions generally have a viscosity of from 200 to 1,500 mPa·s, preferably from 200 to 500 mPa·s. Liquid detergent compositions which are pourable gels generally have a viscosity of from 1,500 mPa·s to 6,000 mPa·s, preferably from 1,500 mPa·s to 2,000 mPa·s.

A composition according to the invention may suitably have an aqueous continuous phase. By "aqueous continuous phase" is meant a continuous phase which has water as its basis. Compositions with an aqueous continuous phase will generally comprise from 15 to 95%, preferably from 20 to 90%, more preferably from 25 to 85% water (by weight based on the total weight of the composition).

A composition according to the invention may also have a low water content, for example when the composition is intended for packaging in polymeric film soluble in the wash water. Low water content compositions will generally comprise no more than 20%, and preferably no more than 10%, such as from 5 to 10% water (by weight based on the total weight of the composition).

A composition of the invention with an aqueous continuous phase preferably has a pH in the range of 5 to 9, more preferably 6 to 8, when measured on dilution of the composition to 1% using demineralised water.

A composition of the invention suitably comprises from 3 to 60%, preferably from 5 to 40%, and more preferably from 6 to 30% (by weight based on the total weight of the composition) of one or more detersive surfactants selected from non-soap anionic surfactants, nonionic surfactants and mixtures thereof.

The term "detersive surfactant" in the context of this invention denotes a surfactant which provides a detersive (i.e. cleaning) effect to laundry treated as part of a domestic laundering process.

Non-soap anionic surfactants for use in the invention are typically salts of organic sulfates and sulfonates having alkyl radicals containing from about 8 to about 22 carbon atoms, the term "alkyl" being used to include the alkyl portion of higher acyl radicals. Examples of such materials include alkyl sulfates, alkyl ether sulfates, alkaryl sulfonates, alpha-olefin sulfonates and mixtures thereof. The alkyl radicals preferably contain from 10 to 18 carbon atoms and may be unsaturated. The alkyl ether sulfates may contain from one to ten ethylene oxide or propylene oxide units per molecule, and preferably contain one to three ethylene oxide units per molecule. The counterion for anionic surfactants is generally an alkali metal such as sodium or potassium; or an ammoniacal counterion such as monoethanolamine, (MEA) diethanolamine (DEA) or triethanolamine (TEA). Mixtures of such counterions may also be employed.

A preferred class of non-soap anionic surfactant for use in the invention includes alkylbenzene sulfonates, particularly linear alkylbenzene sulfonates (LAS) with an alkyl chain length of from 10 to 18 carbon atoms. Commercial LAS is a mixture of closely related isomers and homologues alkyl chain homologues, each containing an aromatic ring sulfonated at the "para" position and attached to a linear alkyl chain at any position except the terminal carbons. The linear alkyl chain typically has a chain length of from 11 to 15 carbon atoms, with the predominant materials having a chain length of about C12. Each alkyl chain homologue consists of a mixture of all the possible sulfophenyl isomers except for the 1-phenyl isomer. LAS is normally formulated into compositions in acid (i.e. HLAS) form and then at least partially neutralized in-situ.

Also suitable are alkyl ether sulfates having a straight or branched chain alkyl group having 10 to 18, more preferably 12 to 14 carbon atoms and containing an average of 1 to 3EO units per molecule. A preferred example is sodium lauryl ether sulfate (SLES) in which the predominantly C12 lauryl alkyl group has been ethoxylated with an average of 3EO units per molecule.

Some alkyl sulfate surfactant (PAS) may be used, such as non-ethoxylated primary and secondary alkyl sulphates with an alkyl chain length of from 10 to 18.

Mixtures of any of the above described materials may also be used. A preferred mixture of non-soap anionic surfactants for use in the invention comprises linear alkylbenzene sulfonate (preferably $C_{11}$ to $C_{15}$ linear alkyl benzene sulfonate) and sodium lauryl ether sulfate. (preferably $C_{10}$ to $C_{18}$ alkyl sulfate ethoxylated with an average of 1 to 3 EO)

In a composition of the invention the total level of non-soap anionic surfactant may suitably range from 5 to 15% (by weight based on the total weight of the composition).

Nonionic surfactants for use in the invention are typically polyoxyalkylene compounds, i.e. the reaction product of alkylene oxides (such as ethylene oxide or propylene oxide or mixtures thereof) with starter molecules having a hydrophobic group and a reactive hydrogen atom which is reactive with the alkylene oxide. Such starter molecules include alcohols, acids, amides or alkyl phenols. Where the starter molecule is an alcohol, the reaction product is known as an alcohol alkoxylate. The polyoxyalkylene compounds can have a variety of block and heteric (random) structures. For example, they can comprise a single block of alkylene oxide, or they can be diblock alkoxylates or triblock alkoxylates. Within the block structures, the blocks can be all ethylene oxide or all propylene oxide, or the blocks can contain a heteric mixture of alkylene oxides. Examples of such materials include $C_8$ to $C_{22}$ alkyl phenol ethoxylates with an average of from 5 to 25 moles of ethylene oxide per mole of alkyl phenol; and aliphatic alcohol ethoxylates such as $C_8$ to $C_{18}$ primary or secondary linear or branched alcohol ethoxylates with an average of from 2 to 40 moles of ethylene oxide per mole of alcohol.

A preferred class of nonionic surfactant for use in the invention includes aliphatic $C_8$ to $C_{18}$, more preferably $C_{12}$ to $C_{15}$ primary linear alcohol ethoxylates with an average of from 3 to 20, more preferably from 5 to 10 moles of ethylene oxide per mole of alcohol.

Mixtures of any of the above described materials may also be used.

In a composition of the invention the total level of nonionic surfactant will suitably range from 1 to 10% (by weight based on the total weight of the composition).

A mixture of non-soap anionic and nonionic surfactants for use in the invention comprises linear alkylbenzene sulfonate (preferably $C_{11}$ to $C_{15}$ linear alkyl benzene sulfonate), sodium lauryl ether sulfate (preferably $C_{10}$ to $C_{18}$ alkyl sulfate ethoxylated with an average of 1 to 3 EO) and ethoxylated aliphatic alcohol (preferably $C_{12}$ to $C_{15}$ primary linear alcohol ethoxylate with an average of from 5 to 10 moles of ethylene oxide per mole of alcohol).

The weight ratio of total non-soap anionic surfactant to total nonionic surfactant in a composition of the invention suitably ranges from about 3:1 to about 1:1.

Optional Ingredients

A composition of the invention may contain further optional ingredients to enhance performance and/or consumer acceptability, as follows:

Non-Aqueous Carriers

A composition of the invention may incorporate non-aqueous carriers such as hydrotropes, co-solvents and phase stabilizers. Such materials are typically low molecular weight, water-soluble or water-miscible organic liquids such as C1 to C5 monohydric alcohols (such as ethanol and n- or i-propanol); C2 to C6 diols (such as monopropylene glycol and dipropylene glycol); C3 to C9 triols (such as glycerol); polyethylene glycols having a weight average molecular weight ($M_w$) ranging from about 200 to 600; C1 to C3 alkanolamines such as mono-, di- and triethanolamines; and alkyl aryl sulfonates having up to 3 carbon atoms in the lower alkyl group (such as the sodium and potassium xylene, toluene, ethylbenzene and isopropyl benzene (cumene) sulfonates).

Mixtures of any of the above described materials may also be used.

Non-aqueous carriers, when included, may be present in an amount ranging from 0.1 to 20%, preferably from 1 to 15%, and more preferably from 3 to 12% (by weight based on the total weight of the composition).

Cosurfactants

A composition of the invention may contain one or more cosurfactants (such as amphoteric (zwitterionic) and/or cationic surfactants) in addition to the non-soap anionic and/or nonionic detersive surfactants described above.

Specific cationic surfactants include C8 to C18 alkyl dimethyl ammonium halides and derivatives thereof in which one or two hydroxyethyl groups replace one or two of the methyl groups, and mixtures thereof. Cationic surfactant, when included, may be present in an amount ranging from 0.1 to 5% (by weight based on the total weight of the composition).

Specific amphoteric (zwitterionic) surfactants include alkyl amine oxides, alkyl betaines, alkyl amidopropyl betaines, alkyl sulfobetaines (sultaines), alkyl glycinates, alkyl carboxyglycinates, alkyl amphoacetates, alkyl amphopropionates, alkylamphoglycinates, alkyl amidopropyl hydroxysultaines, acyl taurates and acyl glutamates, having alkyl radicals containing from about 8 to about 22 carbon atoms, the term "alkyl" being used to include the alkyl portion of higher acyl radicals. Amphoteric (zwitterionic) surfactant, when included, may be present in an amount ranging from 0.1 to 5% (by weight based on the total weight of the composition).

Mixtures of any of the above described materials may also be used.

Builders

A composition of the invention may contain one or more builders. Builders enhance or maintain the cleaning efficiency of the surfactant, primarily by reducing water hardness. This is done either by sequestration or chelation (holding hardness minerals in solution), by precipitation (forming an insoluble substance), or by ion exchange (trading electrically charged particles).

Builders for use in the invention can be of the organic or inorganic type, or a mixture thereof.

Suitable inorganic builders include hydroxides, carbonates, sesquicarbonates, bicarbonates, silicates, zeolites, and mixtures thereof. Specific examples of such materials include sodium and potassium hydroxide, sodium and potassium carbonate, sodium and potassium bicarbonate, sodium sesquicarbonate, sodium silicate and mixtures thereof.

Suitable organic builders include polycarboxylates, in acid and/or salt form. When utilized in salt form, alkali metal (e.g. sodium and potassium) or alkanolammonium salts are preferred. Specific examples of such materials include sodium and potassium citrates, sodium and potassium tartrates, the sodium and potassium salts of tartaric acid monosuccinate, the sodium and potassium salts of tartaric acid disuccinate, sodium and potassium ethylenediaminetetraacetates, sodium and potassium N(2-hydroxyethyl)-ethylenediamine triacetates, sodium and potassium nitrilotriacetates and sodium and potassium N-(2-hydroxyethyl)-nitrilodiacetates. Polymeric polycarboxylates may also be used, such as polymers of unsaturated monocarboxylic acids (e.g. acrylic, methacrylic, vinylacetic, and crotonic acids) and/or unsaturated dicarboxylic acids (e.g. maleic, fumaric, itaconic, mesaconic and citraconic acids and their anhydrides). Specific examples of such materials include polyacrylic acid, polymaleic acid, and copolymers of acrylic and maleic acid. The polymers may be in acid, salt or partially neutralised form and may suitably have a molecular weight (Mw) ranging from about 1,000 to 100,000, preferably from about 2,000 to about 85,000, and more preferably from about 2,500 to about 75,000

Mixtures of any of the above described materials may also be used. Preferred builders for use in the invention may be selected from polycarboxylates (e.g. citrates) in acid and/or salt form and mixtures thereof.

Builder, when included, may be present in an amount ranging from about 0.1 to about 20%, preferably from about 0.5 to about 15%, more preferably from about 1 to about 10% (by weight based on the total weight of the composition).

Transition Metal Ion Chelating Agents

A composition of the invention may contain one or more chelating agents for transition metal ions such as iron, copper and manganese. Such chelating agents may help to improve the stability of the composition and protect for example against transition metal catalyzed decomposition of certain ingredients.

Suitable transition metal ion chelating agents include phosphonates, in acid and/or salt form. When utilized in salt form, alkali metal (e.g. sodium and potassium) or alkanolammonium salts are preferred. Specific examples of such materials include aminotris(methylene phosphonic acid) (ATMP), 1-hydroxyethylidene diphosphonic acid (HEDP) and diethylenetriamine penta(methylene phosphonic acid (DTPMP) and their respective sodium or potassium salts. HEDP is preferred. Mixtures of any of the above described materials may also be used.

Transition metal ion chelating agents, when included, may be present in an amount ranging from about 0.1 to about 10%, preferably from about 0.1 to about 3% (by weight based on the total weight of the composition).

Fatty Acid

A composition of the invention will preferably contain one or more fatty acids and/or salts thereof.

Suitable fatty acids in the context of this invention include aliphatic carboxylic acids of formula RCOOH, where R is a linear or branched alkyl or alkenyl chain containing from 6 to 24, more preferably 10 to 22, most preferably from 12 to 18 carbon atoms and 0 or 1 double bond. Preferred examples of such materials include saturated C12-18 fatty acids such as lauric acid, myristic acid, palmitic acid or stearic acid; and fatty acid mixtures in which 50 to 100% (by weight based on the total weight of the mixture) consists of saturated C12-18 fatty acids. Such mixtures may typically be derived from natural fats and/or optionally hydrogenated natural oils (such as coconut oil, palm kernel oil or tallow).

The fatty acids may be present in the form of their sodium, potassium or ammonium salts and/or in the form of soluble salts of organic bases, such as mono-, di- or triethanolamine.

Mixtures of any of the above described materials may also be used.

Fatty acids and/or their salts, when included, may be present in an amount ranging from about 0.25 to 5%, more preferably from 0.5 to 5%, most preferably from 0.75 to 4% (by weight based on the total weight of the composition).

For formula accounting purposes, in the formulation, fatty acids and/or their salts (as defined above) are not included in the level of surfactant or in the level of builder.

Polymeric Cleaning Boosters

To further improve the environmental profile of liquid laundry detergents it may be preferred in some cases to reduce the volume of laundry detergent dosed per wash-load and to add various highly weight efficient ingredients to the composition to boost cleaning performance. In addition to the soil release polymers of the invention described above, a composition of the invention will preferably contain one or more additional polymeric cleaning boosters such as antiredeposition polymers.

Anti-redeposition polymers stabilise the soil in the wash solution thus preventing redeposition of the soil. Suitable soil release polymers for use in the invention include alkoxylated polyethyleneimines. Polyethyleneimines are materials composed of ethylene imine units $—CH_2CH_2NH—$ and, where branched, the hydrogen on the nitrogen is replaced by another chain of ethylene imine units. Preferred alkoxylated polyethyleneimines for use in the invention have a polyethyleneimine backbone of about 300 to about 10000 weight average molecular weight ($M_w$). The polyethyleneimine backbone may be linear or branched. It may be branched to the extent that it is a dendrimer. The alkoxylation may typically be ethoxylation or propoxylation, or a mixture of both. Where a nitrogen atom is alkoxylated, a preferred average degree of alkoxylation is from 10 to 30, preferably from 15 to 25 alkoxy groups per modification. A preferred material is ethoxylated polyethyleneimine, with an average degree of ethoxylation being from 10 to 30, preferably from 15 to 25 ethoxy groups per ethoxylated nitrogen atom in the polyethyleneimine backbone.

Mixtures of any of the above described materials may also be used.

When included, a composition of the invention will preferably comprise from 0.25 to 8%, more preferably from 0.5 to 6% (by weight based on the total weight of the composition) of one or more anti-redeposition polymers such as, for example, the alkoxylated polyethyleneimines which are described above.

Polymeric Thickeners

A composition of the invention may comprise one or more polymeric thickeners. Suitable polymeric thickeners for use in the invention include hydrophobically modified alkali swellable emulsion (HASE) copolymers. Exemplary HASE copolymers for use in the invention include linear or crosslinked copolymers that are prepared by the addition polymerization of a monomer mixture including at least one acidic vinyl monomer, such as (meth)acrylic acid (i.e. methacrylic acid and/or acrylic acid); and at least one associative monomer. The term "associative monomer" in the context of this invention denotes a monomer having an ethylenically unsaturated section (for addition polymerization with the other monomers in the mixture) and a hydrophobic section. A preferred type of associative monomer includes a polyoxyalkylene section between the ethylenically unsaturated section and the hydrophobic section. Preferred HASE copolymers for use in the invention include linear or crosslinked copolymers that are prepared by the addition polymerization of (meth)acrylic acid with (i) at least one associative monomer selected from linear or branched $C_8$-$C_{40}$ alkyl (preferably linear $C_{12}$-$C_{22}$ alkyl) polyethoxylated (meth)acrylates; and (ii) at least one further monomer selected from $C_1$-$C_4$ alkyl (meth) acrylates, polyacidic vinyl monomers (such as maleic acid, maleic anhydride and/or salts thereof) and mixtures thereof. The polyethoxylated portion of the associative monomer (i) generally comprises about 5 to about 100, preferably about 10 to about 80, and more preferably about 15 to about 60 oxyethylene repeating units.

Mixtures of any of the above described materials may also be used.

When included, a composition of the invention will preferably comprise from 0.1 to 5% (by weight based on the total weight of the composition) of one or more polymeric thickeners such as, for example, the HASE copolymers which are described above.

External Structurants

Compositions of the invention may have their rheology further modified by use of one or more external structurants which form a structuring network within the composition. Examples of such materials include hydrogenated castor oil, microfibrous cellulose and citrus pulp fibre. The presence of an external structurant may provide shear thinning rheology and may also enable materials such as encapsulates and visual cues to be suspended stably in the liquid.

Enzymes

A composition of the invention may comprise an effective amount of one or more enzyme selected from the group comprising, pectate lyase, protease, amylase, cellulase, lipase, mannanase and mixtures thereof. The enzymes are preferably present with corresponding enzyme stabilizers.

Further Optional Ingredients

A composition of the invention may contain further optional ingredients to enhance performance and/or consumer acceptability. Examples of such ingredients include foam boosting agents, preservatives (e.g. bactericides), polyelectrolytes, anti-shrinking agents, anti-wrinkle agents, anti-oxidants, sunscreens, anti-corrosion agents, drape imparting agents, anti-static agents, ironing aids, colorants, pearlisers and/or opacifiers, and shading dye. Each of these ingredients will be present in an amount effective to accomplish its purpose. Generally, these optional ingredients are included individually at an amount of up to 5% (by weight based on the total weight of the composition).

Packaging and Dosing

A composition of the invention may be packaged as unit doses in polymeric film soluble in the wash water. Alternatively, a composition of the invention may be supplied in multidose plastics packs with a top or bottom closure. A dosing measure may be supplied with the pack either as a part of the cap or as an integrated system.

A method of laundering fabric using a composition of the invention will usually involve diluting the dose of detergent composition with water to obtain a wash liquor, and washing fabrics with the wash liquor so formed.

The dilution step preferably provides a wash liquor which comprises inter alia from about 3 to about 20 g/wash of detersive surfactants (as are further defined above).

In automatic washing machines the dose of detergent composition is typically put into a dispenser and from there it is flushed into the machine by the water flowing into the machine, thereby forming the wash liquor. From 5 up to about 65 litres of water may be used to form the wash liquor depending on the machine configuration. The dose of detergent composition may be adjusted accordingly to give appropriate wash liquor concentrations. For example, dosages for a typical front-loading washing machine (using 10 to 15 litres of water to form the wash liquor) may range from about 10 ml to about 60 ml, preferably about 15 to 40 ml. Dosages for a typical top-loading washing machine (using from 40 to 60 litres of water to form the wash liquor) may be higher, e.g. up to about 100 ml.

A subsequent aqueous rinse step and drying the laundry is preferred.

The invention will now be further described with reference to the following non-limiting Examples.

EXAMPLES

Synthesis of poly(propylene-2,5-furandicarboxylate)-PP06.5/MPEG46 block copolymer (Example Polymer 1)

Using a 3-necked 50 ml round bottom flask fitted with a digital thermometer, Argon inlet with in-line bubbler, air condenser in the form of an angled drying tube, 2,5-dimethyl furan-2,5-dicarboxylate (3.68 g, 0.02 mol) and 1,2 propane diol (3.35 g, 0.04 mol) were weighed into the flask, which also contained a magnetic stirrer bar. Also added were the condensation catalyst titanium tetraisopropylate (0.004 g, 1.4×10-5 mol) and sodium acetate (0.0074 g, 9×10-5 mol). The contents of the flask were heated on maximum power under a constant stream of Argon and constant stirring. When the temperature of the molten mixture in the flask reached 180-200° C., methanol was distilled off, indicating that polycondensation was occurring. Large droplets were also observed in the drying tube, probably indicating PG distilling off. Heating continued until the temperature of the mixture reached 200° C., which was held for 2 hours. At this point, the reaction mixture had turned to a dark brown colour.

The contents of the flask were then allowed to cool to about 140° C., at which point MPEG-PPG 46/6.5 (6 g, 0.003 mol) was added to the flask. The mixture was then heated again to 200° C. and held at this temperature for 3 hours.

NMR analysis showed large presence of oligomers/residual PG, so heating continued under Ar atmosphere and applying a vacuum using a diaphragm pump for 1 hour. The mixture was heated for a further 1 hr at 200° C. under vacuum, then increasing this to 240° C. for a further 30 mins. At this point, a small amount of white solid was observed at the neck of the flask, indicating possibly sublimed residual furan monomer. The product was then recovered from the flask as a soft, sticky, dark brown mass (yield=9 g).

A polymer according to formula (III) is obtained, in which A is a 2,5-furanylene ring; X is methyl; m is 6.5, n is 46 and z is from 3 to 10.

$$X\text{-}[(EO)_n(PO)_m]\text{—}[OC(O)\text{-}A\text{-}C(O)O\text{—}CH_2CH(CH_3)]_z\text{—}OC(O)\text{-}A\text{-}C(O)O\text{—}[(PO)_m(EO)_n]\text{—}X \quad (III)$$

Synthesis of poly(ethylene-2,5-furandicarboxylate)-PEG2K copolymer (Based on Method and Structure Disclosed in JP2015105373* (Comparative Polymer A)

Example 1 and Table 1, Entry 3

Using a 3-necked 50 ml round bottom flask fitted with a digital thermometer, Argon inlet with in-line bubbler, air condenser in the form of an angled drying tube, 2,5-furandicarboxylic acid (3 g, 0.02 mol), ethylene glycol (2.03 g, 0.033 mol) and PEG2K (11.55 g; 0.00578 mol) were weighed into the flask, which also contained a magnetic stirrer bar. Also added were the condensation catalyst titanium tetraisopropylate (0.004 g, 1.4×10-5 mol) and sodium acetate (0.0074 g, 9×10-5 mol). The contents of the flask were heated on maximum power under a constant stream of Argon and constant stirring. When the temperature of the molten mixture in the flask reached 150° C., droplets were observed at the top of the flask and in the drying tube, indicating that polycondensation was occurring. Heating continued until the temperature of the mixture reached 180° C., which was held for 1 hr, followed by heating to 190° C./1 hr, followed by heating to 205-210° C./2 hrs. At this point, the reaction mixture had turned to a dark brown colour. Water droplets were also observed in the drying tube.

The flask was then connected to the diaphragm pump and left to heat under vacuum at 215-220° C./1 hr, then increased to 225-230° C./30 mins under vacuum. The product was then recovered from the flask as a soft, sticky, dark brown mass.

A polymer is obtained with repeating units of formula:

$$\text{—}[OC(O)\text{-}A\text{-}C(O)O\text{—}CH_2CH_2\text{—}OC(O)\text{-}A\text{-}C(O)O\text{-}(EO)_p]\text{—}$$

in which A is a 2,5-furanylene ring and p is 46.

Stability Test in Detergent Formulation

Example Polymer 1 (according to the invention) and Comparative Polymer A (not according to the invention) were evaluated for their stability in a liquid laundry detergent formulation. The ingredients of the formulations tested are given in Table 1 below. All weight percentages are by weight based on total weight of the formulation, unless otherwise specified.

TABLE 1

| | wt % (active ingredient) | | |
|---|---|---|---|
| Ingredient | Control | Formula 1 | Formula A |
| LAS acid[1] | 5.82 | 5.82 | 5.82 |
| SLES 3EO | 4.37 | 4.37 | 4.37 |
| Nonionic surfactant[2] | 4.37 | 4.37 | 4.37 |
| Triethanolamine | 8.82 | 8.82 | 8.82 |
| Fatty acids, C12-18 | 0.86 | 0.86 | 0.86 |
| Citric acid | 1.00 | 1.00 | 1.00 |
| HEDP | 1.50 | 1.50 | 1.50 |
| Glycerol | 2.00 | 2.00 | 2.00 |
| EPEI[3] | 3.10 | 3.10 | 3.10 |
| Thickener[4] | 0.70 | 0.70 | 0.70 |
| Example Polymer 1 | — | 2.14 | — |
| Comparative Polymer A | — | — | 2.14 |
| Fluorescer, fragrance, preservative, water | | q.s. to 100 | |

(1) $C_{12-14}$ linear alkylbenzene sulfonic acid
(2) $C_{12-15}$ alcohol ethoxylate (7EO)
(3) Sokalan ®HP20 (ex BASF)
(4) HASE copolymer Stability was assessed by a visual examination of the clarity of the product to determine if the polymer had completely dissolved. The results are shown in Table 2.

TABLE 2

| Visual assessment timings | Control | Formula 1 | Formula A |
|---|---|---|---|
| T = 0 | Clear | Clear | Significant proportion of undissolved polymer |
| T = 2 weeks | Clear | Clear | Significant proportion of undissolved polymer |

Performance Evaluation

Formula 1 (according to the invention) and Formula A (not according to the invention) were also evaluated for their stain removal performance, using a Tergotometer, with a wash volume of 1 litre using water of 13 degrees French hardness (Ca:Mg 10:3). Wash temperature was set to 25° C. and the agitation was set to 100 oscillations per minute. A liquor to cloth ratio of 25:1 was used, with a 1:1 weight ratio of knitted polyester to woven cotton. The main wash cycle lasted 20 minutes and was followed by two rinses. Test fabrics were hand squeezed dry, then given a few minutes in a spin dryer, fresh ballast was used in each wash.

Stains were applied to the pre-washed test fabrics after two prewashes. Two stains were used on each piece of test fabric: (i) violet dye in sunflower oil and (ii) dirty motor oil.

The stained fabrics were then washed before being placed on a drying rack and left overnight. The colour of the stains was measured both before and after washing using an X-rite spectrophotometer and expressed in terms of the difference between the stained fabric and an identical but unstained and unwashed fabric to give ΔE*(before wash) or ΔE*(after wash) values respectively. The ΔE* values denote the colour differences defined as the Euclidian distance between the stain and clean cloth in L*a*b* colour space. The results are shown in Table 3.

TABLE 3

| | ΔE*(after wash) | | |
|---|---|---|---|
| Stain | Control | Formula 1 | Formula A |
| Violet dye in sunflower oil | 36.78 | 0.37 | 38.33 |
| Dirty motor oil | 47.71 | 38.83 | 39.35 |

The invention claimed is:

1. A laundry detergent composition comprising:
at least one detersive surfactant; and
a soil release polymer comprising:
a capped polyoxyalkylene end block connected to a polyester segment;
wherein the polyester segment comprises alternating —$B^1$-A-$B^2$— and —R— units, $B^1$ and $B^2$ are each independently selected from —OC(O)— and —C(O)O— groups, A is a 2,5-furanylene ring, and R is a divalent alkylene radical.

2. The composition according to claim 1, wherein the amount of polymer is from 0.1 to 10% by weight based on the total weight of the composition.

3. The composition according to claim 2, wherein the composition is in the form of a liquid,
wherein at least one detersive surfactant is selected from the group consisting of non-soap anionic surfactants, nonionic surfactants and mixtures thereof, and wherein the amount of detersive surfactant is from 3 to 60% by weight based on the total weight of the composition.

4. The composition according to claim 1, further comprising from 0.5 to 6% by weight based on the total weight of the composition of one or more anti-redeposition polymers selected from alkoxylated polyethyleneimines.

5. A method of laundering fabric using a composition, the method comprising:
diluting a dose of the composition to obtain a wash liquor; and
washing fabrics with the wash liquor so formed, wherein the composition comprises:
at least one detersive surfactant; and
a soil release polymer comprising:
a capped polyoxyalkylene end block connected to a polyester segment;
wherein the polyester segment comprises alternating —$B^1$-A-$B^2$— and —R— units, $B^1$ and $B^2$ are each independently selected from —OC(O)— and —C(O)O— groups, A is a 2,5-furanylene ring, and R is a divalent alkylene radical.

* * * * *